US012565079B2

(12) United States Patent
Dede et al.

(10) Patent No.: US 12,565,079 B2
(45) Date of Patent: Mar. 3, 2026

(54) TRANSPARENT DISPLAY SYSTEMS AND METHODS

(71) Applicant: Toyota Motor Engineering & Manufacturing North America, Inc., Plano, TX (US)

(72) Inventors: Ercan Mehmet Dede, Ann Arbor, MI (US); Sean Rodrigues, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 895 days.

(21) Appl. No.: 17/843,159

(22) Filed: Jun. 17, 2022

(65) Prior Publication Data
US 2023/0406061 A1 Dec. 21, 2023

(51) Int. Cl.
| | |
|---|---|
| *B60H 1/00* | (2006.01) |
| *B60K 35/10* | (2024.01) |
| *B60K 35/22* | (2024.01) |
| *B60K 35/25* | (2024.01) |

(Continued)

(52) U.S. Cl.
CPC ....... *B60H 1/00735* (2013.01); *B60H 1/0065* (2013.01); *B60K 35/10* (2024.01); *B60K 35/22* (2024.01); *B60K 35/25* (2024.01); *B60K 35/60* (2024.01); *B60K 35/80* (2024.01); *B60K 2360/1434* (2024.01); *B60K 2360/1438* (2024.01); *B60K 2360/785* (2024.01); *B60Y 2200/11* (2013.01)

(58) Field of Classification Search
CPC ........ B60K 35/00; B60K 35/10; B60K 35/22; B60K 35/25; B60K 35/60; B60K 35/80
See application file for complete search history.

(56) References Cited

U.S. PATENT DOCUMENTS

| | | | |
|---|---|---|---|
| 4,820,902 A | | 4/1989 | Gillery |
| 5,162,191 A | | 11/1992 | Sedberry |
| 7,200,921 B2 | | 4/2007 | Loibl |

(Continued)

FOREIGN PATENT DOCUMENTS

| | | | |
|---|---|---|---|
| CN | 114291125 A | * | 4/2022 |
| JP | 2000112536 A | * | 4/2000 |

(Continued)

OTHER PUBLICATIONS

Gallo, S. et al., "Encoded and Crossmodal Thermal Stimulation Through a Fingertip-Sized Haptic Display," frontiers In Robotics and AI, Oct. 2015, pp. 1-12 (12 pages).

(Continued)

*Primary Examiner* — Woody A Lee, Jr.
(74) *Attorney, Agent, or Firm* — Christopher G. Darrow; Darrow Mustafa PC

(57) ABSTRACT

A transparent display system comprises a transparent display, a touch-sensitive layer, and a heater layer. The touch-sensitive layer is connected to the transparent display and is configured to detect a user's touch on the transparent display. The heater layer is connected to the transparent display and comprises a trace array and one or more electrodes. The electrodes are operable to activate the trace array to generate heat in the location of the user's touch to generate thermohaptic feedback to communicate information to the user.

20 Claims, 8 Drawing Sheets

(51) Int. Cl.
  *B60K 35/60* (2024.01)
  *B60K 35/80* (2024.01)

(56) References Cited

U.S. PATENT DOCUMENTS

| | | | |
|---|---|---|---|
| 7,671,851 | B1 | 3/2010 | Pryor |
| 9,340,155 | B2 | 5/2016 | Pisz et al. |
| 10,466,392 | B1 | 11/2019 | Melcher et al. |
| 11,130,314 | B2 | 9/2021 | Yoon et al. |
| 11,168,937 | B2 | 11/2021 | Lee et al. |
| 11,665,788 | B1 | 5/2023 | Dede et al. |
| 2002/0159270 | A1 | 10/2002 | Lynam et al. |
| 2003/0227663 | A1 | 12/2003 | Agrawal et al. |
| 2005/0064936 | A1 | 3/2005 | Pryor |
| 2006/0255960 | A1 | 11/2006 | Uken et al. |
| 2008/0143338 | A1 | 6/2008 | Sekine et al. |
| 2008/0170982 | A1 | 7/2008 | Zhang et al. |
| 2008/0302014 | A1* | 12/2008 | Szczerba ............... B60K 35/10 49/31 |
| 2010/0059494 | A1 | 3/2010 | Keite-Telgenbuscher et al. |
| 2013/0028503 | A1 | 1/2013 | Wakui et al. |
| 2013/0166146 | A1 | 6/2013 | Tanaka |
| 2014/0111711 | A1 | 4/2014 | Iwami et al. |
| 2016/0236612 | A1 | 8/2016 | Caron |
| 2017/0103697 | A1 | 4/2017 | Kawashima et al. |
| 2017/0118800 | A1 | 4/2017 | Baba et al. |
| 2018/0094471 | A1 | 4/2018 | Mitchell |
| 2018/0297331 | A1 | 10/2018 | Gahagan |
| 2019/0168612 | A1* | 6/2019 | Schnur ................... B60K 35/10 |
| 2019/0324274 | A1 | 10/2019 | Kalinowski et al. |
| 2020/0060041 | A1 | 2/2020 | Wang et al. |
| 2021/0054691 | A1 | 2/2021 | Ramirez |
| 2021/0221228 | A1 | 7/2021 | Barry et al. |
| 2021/0323410 | A1 | 10/2021 | Huber |
| 2021/0389615 | A1 | 12/2021 | Rodrigues |

FOREIGN PATENT DOCUMENTS

| | | | | |
|---|---|---|---|---|
| KR | 20190045433 | A | 5/2019 | |
| KR | 20190129579 | A | 11/2019 | |
| WO | WO-2009007952 | A2 * | 1/2009 | ............. G06F 3/016 |
| WO | WO-2020044079 | A1 * | 3/2020 | |

OTHER PUBLICATIONS

Kratz, S. et al., "ThermoTouch: a New Scalable Hardware Design for Thermal Displays," ISS '17: Proceedings of the 2017 ACM International Conference on Interactive Surfaces and Spaces, Oct. 17, 2017 pp. 132-141, https://doi.org/10.1145/3132272.3134133 (10 pages).

Wettach, R. et al., "A Thermal Information display for Mobile Applications," 9th Intl. Conf. on Human Computer Interaction with Mobile Devices and Services, MobileHCI '07, Sep. 9, 2007 pp. 182-185, https://doi.org/10.1145/1377999.1378004, (4 pages).

Richter, H. et al., "Reproducing Materials of Virtual Elements on Touchscreens using Supplemental Thermal Feedback," Proceedings of the 14th ACM International Conference on Multimodal Interaction, Oct. 22, 2012, pp. 385-392, https://doi.org/10.1145/2388676.2388765 (8 pages).

* cited by examiner

TRANSPARENT DISPLAY SYSTEMS AND METHODS

TECHNICAL FIELD

The embodiments disclosed herein relate to displays and, more particularly, to systems and methods for a transparent display system.

BACKGROUND

Display devices are widely used in various implementations, for example, computers, mobile phones, televisions, etc. Display devices may be used to display content such as text, images, and/or video to a user of the display device to communicate information to the user. In some instances, it may be advantageous to communicate information to a user of the display device in another manner, for example, through haptic feedback.

SUMMARY

Disclosed herein are thermo-haptic feedback-based embodiments of a transparent display system, a vehicular body structure including a transparent display system forming at least a portion of a window, and a method for communicating information to a user of a transparent display system.

In one aspect, a transparent display system is disclosed. The transparent display system includes a transparent display, a touch-sensitive layer, and a heater layer. The touch-sensitive layer is connected to the transparent display and is configured to detect a user's touch on the transparent display. The heater layer is connected to the transparent display and includes a trace array and one or more electrodes. The electrodes are operable to activate the trace array to generate heat in the location of the user's touch to generate thermo-haptic feedback to communicate information to the user.

In another aspect, a vehicular body structure is disclosed. The vehicular body structure includes a window frame, a window, and a transparent display system. The window is configured for installation in the window frame. The transparent display system forms at least a portion of the window and comprises a transparent display, a touch-sensitive layer, and a heater layer. The touch-sensitive layer is connected to an inside of the transparent display and is configured to detect a user's touch on the transparent display. The heater layer is connected to an inside of the transparent display and includes a trace array and one or more electrodes. The one or more electrodes are operable to activate the trace array to generate heat in the location of the user's touch to generate thermo-haptic feedback to communicate information to the user.

In yet another aspect, a method of communicating information to a user of a transparent display system is disclosed. The transparent display system includes a transparent display, a touch-sensitive layer connected to the transparent display, and a heater layer connected to the transparent display. The heater layer includes a trace array and one or more electrodes. The method includes receiving, using a computing device, information to communicate to the user. The method also includes detecting, using the touch-sensitive layer, the location of a user's touch on the transparent display. The method further includes operating, using the computing device, based on the information and the location of the user's touch on the transparent display, the one or more electrodes to activate the trace array to generate heat in the location of the user's touch to generate thermo-haptic feedback to communicate the information to the user.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a transparent display system. The transparent display system includes a transparent display, a touch-sensitive layer, and a heater layer. The touch-sensitive layer is connected to the transparent display and is configured to detect a user's touch on the transparent display. The heater layer is connected to the transparent display and comprises a trace array and one or more electrodes. The electrodes are operable to activate the trace array to generate heat in the location of the user's touch to generate thermo-haptic feedback to communicate information to the user.

Figure 1:
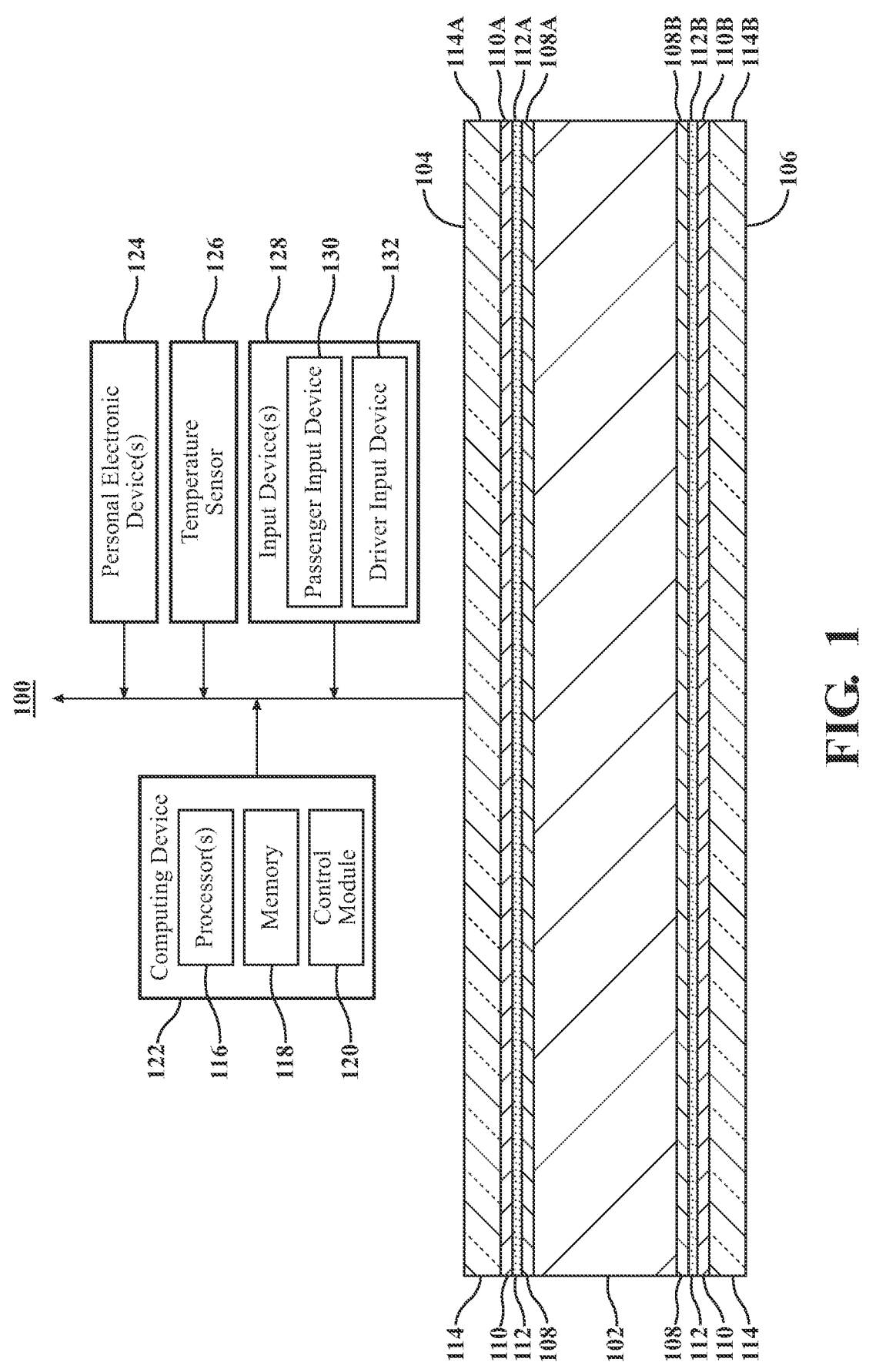
FIG. 1 is an example of a transparent display system including a transparent display, one or more touch-sensitive layers, and one or more heater layers.

Referring now to FIG. 1, an example of a transparent display system 100 is shown. Among other components, the transparent display system 100 includes a transparent display 102 which can be configured to display content, such as text, images, and/or video. The transparent display 102 includes a first side 104 and a second side 106. In the illustrated dual-sided implementation, the transparent display 102 can be configured to display content on both sides of the transparent display 102. In other implementations, the transparent display 102 can be configured to display content on only one side of the transparent display 102, for example, on the first side 104 or on the second side 106. One or more of the components of the transparent display system 100 can be substantially transparent such that a person can see through the transparent display system 100. As described in further detail below, one or more components of the transparent display system 100 can be formed using materials that are substantially transparent or clear and/or using materials formed at a small enough scale such that they have insignificant light absorption. Accordingly, the transparent display system 100 can be used in connection with a screen, such as a laptop screen (or a mobile device screen, etc.), a transparent partition, barrier, or wall between people for health or safety purposes, a transparent wall of a room, or a window, such as a building window, a vehicle window, a business service window, etc. For example, the transparent display system 100 can form at least a portion of a building wall or window or a vehicle window.

The transparent display system 100 also includes one or more the touch-sensitive layers 108. The touch-sensitive layer(s) 108 are configured to detect a user's touch on the transparent display 102. For example, the touch-sensitive layer(s) 108 are configured to detect a user's finger or hand when placed on the transparent display system 100. The touch-sensitive layer(s) 108 can be any suitable kind of touch-sensitive layers. For example, the touch-sensitive layer(s) 108 can be resistive touch layer(s), capacitive touch layer(s), etc. By detecting a user's touch on the transparent display system 100, the touch-sensitive layer(s) 108 can be configured to activate, deactivate, or otherwise control the content displayed on the transparent display 102 based on the location of the user's touch. The touch-sensitive layer(s) 108 can also be configured to activate, deactivate, or otherwise directly or indirectly control other components of the transparent display system 100 based on the location of the user's touch, as described in further detail below.

The touch-sensitive layer(s) 108 may be connected to the transparent display 102 external to the transparent display 102. For example, the touch-sensitive layer(s) 108 may be connected to the first side 104 and/or the second side 106. The touch-sensitive layer(s) 108 may be connected to the transparent display 102 under one or more components of the transparent display system 100, or the touch-sensitive layer(s) 108 can be connected to the transparent display 102 over one or more components of the transparent display system 100, for example, over an adhesive layer, as described in further detail below. In some arrangements, the transparent display system 100 can include a touch-sensitive layer 108 connected to and external to the first side 104 or a touch-sensitive layer 108 connected to and external to the second side 106. In other arrangements, as shown in FIG. 1, the transparent display system 100 can include a first touch-sensitive layer 108A connected to and external to the first side 104 and a second touch-sensitive layer 108B connected to and external to the second side 106. The touch-sensitive layer(s) 108 can be formed from one or more substantially transparent materials, for example, glass and/or plastic and may use any suitable touch-sensitive technology, for example, electrical conductors formed from indium tin oxide (ITO), which in some instances, may not be substantially transparent, but may be formed from thin wires that have insignificant light absorption.

The transparent display system 100 also includes one or more heater layers 110. The heater layer(s) 110 are operable to generate heat to heat at least a portion of the transparent display system 100, including at least a portion of the transparent display 102. More specifically, the heater layer(s) 110 may be operated to generate heat in an area corresponding to the location of the user's touch on the transparent display 102. For example, when a user of the transparent display system 100 touches the transparent display system 100, the heater layer(s) 110 may be operated to generate heat in the area touched by the user. The heater layer(s) 110 may be operable to locally generate heat in any suitable manner, for example, through Joule heating (resistive heating), and the heater layer(s) 110 may be formed from any suitable type of material configured to generate heat upon the application of electrical energy. For example, in some arrangements, as will be described in further detail below in connection with FIGS. 2A and 2B, the heater layer(s) 110 may be formed from one or more traces of indium tin oxide (ITO). The ITO traces may be sufficiently thin such that the ITO is substantially transparent and does not substantially affect the transparency of the transparent display system 100. In other arrangements, as will be described in further detail below in connection with FIG. 2C, the heater layer(s) 110 may be formed from sections of polythiophene (PEDOT), formed as polythiophene pads 240, which may be substantially transparent. In other arrangements, the heater layer(s) 110 can be formed from any other suitable material, such as carbon nanotube hybrids.

The heater layer(s) 110 can be connected to the transparent display 102 external to the transparent display 102. The heater layer(s) 110 can be connected to the transparent display 102 under the touch-sensitive layer(s) 108, or the heater layer(s) 110 can be connected to the transparent display 102 over the touch-sensitive layer(s) 108, as shown. For example, the transparent display system 100 can include a heater layer 110 connected to the first side 104 over a touch-sensitive layer 108, or the transparent display system 100 can include a heater layer 110 connected to the second side 106 under a touch-sensitive layer 108. As shown in FIG. 1, the transparent display system 100 includes a first heater layer 110A connected to the first side 104 over the first touch-sensitive layer 108A and a second heater layer 110B connected to the second side 106 over the second touch-sensitive layer 108B. As mentioned above, the heater layer(s) 110 may be operable to locally generate heat in an area corresponding to the location of a user's touch on the transparent display 102. For example, when the user's touch is detected by the first touch-sensitive layer 108A, the first heater layer 110A may be operated to locally generate heat in an area corresponding to the location of the user's touch on the first side 104. Similarly, when the user's touch is detected by the second touch-sensitive layer 108B, the second heater layer 110B may be operated to locally generate heat in an area corresponding to the location of the user's touch on the second side 106.

The transparent display system 100 also includes one or more adhesive layers 112. The adhesive layer(s) 112 can be configured to connect one or more of the components of the transparent display system 100. For example, as shown, the transparent display system 100 can include a first adhesive layer 112A configured to connect the first heater layer 110A to the first touch-sensitive layer 108A and a second adhesive layer 112B configured to connect the second heater layer 110B to the second touch-sensitive layer 108B. The transparent display system 100 can also include adhesive layer(s) 112 configured to connect the touch-sensitive layer(s) 108 to the transparent display 102, as well as other adhesive layer(s) 112 configured to connect the other components of the transparent display system 100. The adhesive layer(s) 112 can include any suitable adhesive, for example, pressure-sensitive adhesive (PSA), and the adhesive layer(s) 112 can be substantially transparent (e.g., formed from clear epoxy, clear resin, etc.).

The transparent display system 100 also includes one or more outer layers 114. The outer layer(s) 114 can be transparent panels, such as glass panels. The outer layer(s) 114 may be configured to cover, seal, protect, and/or enclose the components of the transparent display system 100. The outer layer(s) 114 may be connected to the transparent display 102 over the touch-sensitive layer(s) 108, the heater layer(s) 110, and/or the adhesive layer(s) 112, and can include a first outer layer 114A connected to the first heater layer 110A and a second outer layer 114B connected to the second heater layer 110B. In some arrangements, the outer layer(s) 114 can be components typical of windows such as window panes. The outer layer(s) 114 can be connected to the heater layer(s) 110 using one or more adhesive layer(s) 112.

With continued reference to FIG. 1, in the top-down direction of the illustrated horizontal orientation, the transparent display system 100 includes the first outer layer 114A, the first heater layer 110A, the first adhesive layer 112A, the first touch-sensitive layer 108A, the transparent display 102, the second touch-sensitive layer 108B, the second adhesive layer 112B, the second heater layer 110B, and the second outer layer 114B. However, the aforementioned components of the transparent display system 100 may be arranged in any suitable layer-wise configuration. For example, the heater layer(s) 110 may be located between the touch-sensitive layer(s) 108 and the transparent display 102. The transparent display system 100 may also include one or more processors 116, a memory 118, and a control module 120, which together may form a computing device 122 configured to orchestrate operation of the transparent display system 100, as will be described in further detail below.

Figures 2A, 2B, 2C:
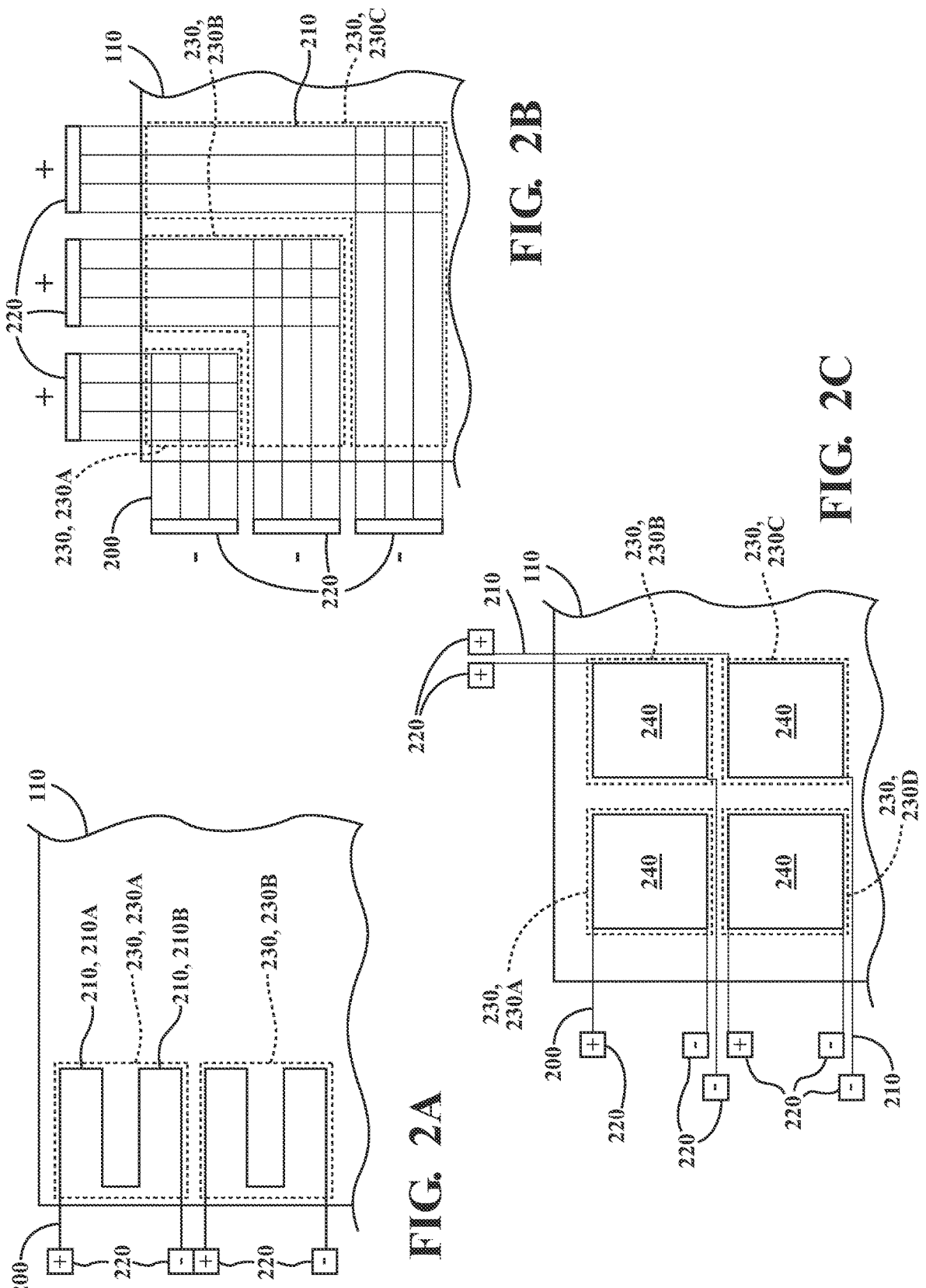
FIG. 2A is a first example of a heater layer including heat pixels in which each heat pixel is formed from a single trace.
FIG. 2B is a second example of a heater layer including heat pixels in which each heat pixel is formed from multiple traces.
FIG. 2C is a third example of a heater layer including heat pixels in which each heat pixel is formed from a polythiophene pad.

Referring now to FIGS. 2A-2C, various examples of the heater layer(s) 110 will now be described. In each example, each of the heater layer(s) 110 can include a trace array 200, including one or more traces 210, and one or more electrodes 220. The trace(s) 210 are configured in serpentine fashion and are electrically connected to the electrode(s) 220, which are operable to activate the trace array 200 to locally generate heat. As mentioned above, the trace(s) 210 can be formed from any material configured to generate heat upon application of electrical energy by the electrode(s) 220, for example, polythiophene (PEDOT), indium tin oxide (ITO), carbon nanotube hybrids, etc. The trace array 200 can be configured such that it is pixelated. In other words, the trace array 200 may form a grid of individually addressable heat pixels 230.

As shown in FIG. 2A, each heat pixel 230 may be formed using a single trace 210. FIG. 2A shows a first trace 210A forming a first heat pixel 230A and a second trace 210B forming a second heat pixel 230B. This arrangement may be useful for activating portions of the heater layer(s) 110 located near an edge of the heater layer(s) 110 and/or an edge of the transparent display 102 to generate heat. As shown in FIG. 2B, each heat pixel 230 may be formed using multiple traces 210 connected to each other. FIG. 2B shows a first heat pixel 230A, a second heat pixel 230B, and a third heat pixel 230C, each formed from multiple traces 210 connected to each other. The multiple traces 210 may each be functionally sized in width to balance the Joule heating across the each heat pixel 230 for optimal heating functionality. This arrangement may be useful for activating increasingly larger areas of the heater layer(s) 110 to generate heat. As shown in FIG. 2C, each heat pixel 230 may be formed from a polythiophene pad 240 connected to one or more traces 210. FIG. 2C shows a first heat pixel 230A, a second heat pixel 230B, a third heat pixel 230C, and a fourth heat pixel 230D, each formed from a polythiophene pad 240. This arrangement may be useful for activating relatively smaller areas of the heater layer(s) 110 to locally generate heat. In any of the aforementioned arrangements, the heat pixel(s) 230 may be configured for individual activation based on the location of a user's touch. More specifically, the electrode(s) 220 may be operated based on the location of a user's touch to activate the heat pixel(s) 230 to generate heat in the location of the user's touch.

For example, referring to FIG. 2A, when a user touches the transparent display system 100 in an area corresponding to the first heat pixel 230A, the electrode(s) 220 connected to the first heat pixel 230A may be operated to activate the first heat pixel 230A to generate heat. Similarly, if a user touches the transparent display system 100 in an area corresponding to the second heat pixel 230B, the electrode(s) 220 connected to the second heat pixel 230B may be operated to activate the second heat pixel 230B to generate heat. In some instances, the user may touch both the first heat pixel 230A and the second heat pixel 230B at the same time, for example, by placing a palm over both the first heat pixel 230A and the second heat pixel 230B. In these instances, the electrodes 220 connected to both the first heat pixel 230A and the second heat pixel 230B can be operated to activate the first heat pixel 230A and the second heat pixel 230B to generate heat. The amount of heat generated by each heat pixel 230 may or may not be the same.

In another example, referring to FIG. 2B, when a user touches the transparent display system 100 in an area corresponding to the first heat pixel 230A, the electrode(s) 220 connected to the first heat pixel 230A may be operated to activate the first heat pixel 230A to generate heat. As shown, the first heat pixel 230A is generally square-shaped. When a user touches the transparent display system 100 in an area corresponding to the second heat pixel 230B, the electrode(s) 220 connected to the second heat pixel 230B may be operated to activate the second heat pixel 230B to generate heat. As shown, the second heat pixel 230B is generally shaped like a backwards L. When a user touches the transparent display system 100 in an area corresponding to the third heat pixel 230C, the electrode(s) 220 connected to the third heat pixel 230C may be operated to activate the third heat pixel 230C to generate heat. Like the second heat pixel 230B, the third heat pixel 230C, as shown, is generally shaped like a backwards L. In some instances, the user may touch the first heat pixel 230A, the second heat pixel 230B, and the third heat pixel 230C at the same time, for example, by placing a finger, multiple fingers, or a palm over the first heat pixel 230A, the second heat pixel 230B, and the third heat pixel 230C. In these instances, the electrodes 220 connected to the first heat pixel 230A, the second heat pixel 230B, and the third heat pixel 230C can be operated to activate the first heat pixel 230A, the second heat pixel 230B, and the third heat pixel 230C to generate heat. The amount of heat generated by each heat pixel 230 may or may not be the same.

In another example, referring to FIG. 2C, when a user touches the transparent display system 100 in an area corresponding to the first heat pixel 230A, the electrode(s) 220 connected to the first heat pixel 230A may be operated to activate the first heat pixel 230A to generate heat. When a user touches the transparent display system 100 in an area corresponding to the second heat pixel 230B, the electrode(s) 220 connected to the second heat pixel 230B may be operated to activate the second heat pixel 230B to generate heat. When a user touches the transparent display system 100 in an area corresponding to the third heat pixel 230C, the electrode(s) 220 connected to the third heat pixel 230C may be operated to activate the third heat pixel 230C to generate heat. When a user touches the transparent display system 100 in an area corresponding to the fourth heat pixel 230D, the electrode(s) 220 connected to the fourth heat pixel 230D may be operated to activate the fourth heat pixel 230D to generate heat. In some instances, the user may touch the first heat pixel 230A, the second heat pixel 230B, the third heat pixel 230C, and the fourth heat pixel 230D at the same time, for example, by placing multiple fingers or a palm over the first heat pixel 230A, the second heat pixel 230B, the third heat pixel 230C, and the fourth heat pixel 230D. In these instances, the electrodes 220 connected to the first heat pixel 230A, the second heat pixel 230B, the third heat pixel 230C, and the fourth heat pixel 230D can be operated to activate the first heat pixel 230A, the second heat pixel 230B, the third heat pixel 230C, and the fourth heat pixel 230D to generate heat. The amount of heat generated by each heat pixel 230 may or may not be the same.

In some arrangements, the transparent display system 100 can be used to generate thermo-haptic feedback to communicate information to users of the transparent display system 100. This may be advantageous to people who are disabled, for example, people who have loss of vision and/or loss of hearing. Users of the transparent display system 100 can place a hand on the transparent display 102 and receive information that is encoded in a temperature-based format. In some arrangements, the transparent display system 100 can be used in a ride-sharing vehicle, for example, as a transparent safety partition and/or a service window, and can be used to generate thermo-haptic feedback to communicate information to passengers of the vehicles. In other words, the transparent display system 100 can be used to thermo-haptically communicate information to a passenger. For example, passengers of ride-sharing vehicles who may be disabled (e.g., passengers who have loss of vision and/or loss of hearing) may use the transparent display system 100 to receive information from the driver of the vehicle, information about the trip, and/or any other information that the passenger might benefit from.

Figure 3A:
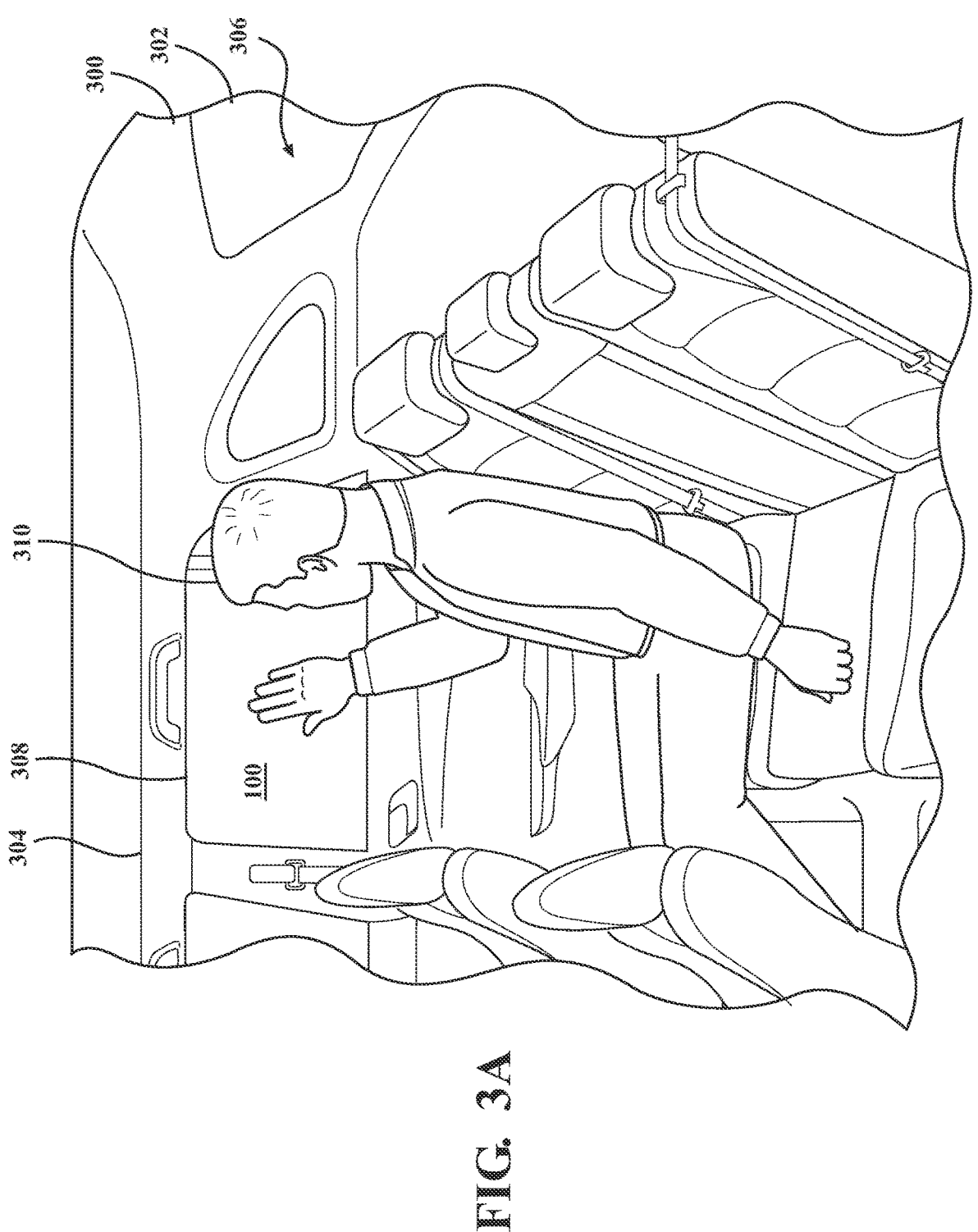
FIG. 3A is an example of a passenger of a vehicle using the transparent display system in connection with a window of the vehicle.

Referring now to FIG. 3A, a portion of vehicle 300 is shown. As mentioned above, the vehicle 300 may be configured as a ride-sharing vehicle. The vehicle 300 includes a vehicular body structure 302 defining a window frame 304 and a passenger cabin 306. The vehicle 300 also includes a window 308 configured for installation in the window frame 304 and a transparent display system 100 forming at least a portion of the window 308. The transparent display system 100 may be used by a passenger 310 of the vehicle 300. As shown, the first side 104 of the transparent display system 100 can be an inside of the window 308 and the second side 106 of the transparent display system 100 can be an outside of the window 308. In this implementation, the transparent display system 100 can include a touch-sensitive layer 108 and a heater layer 110 both connected to the inside of the window 308 (e.g., connected to the first side 104 of the transparent display system 100). Accordingly, the touch-sensitive layer 108 can be configured to a touch from the passenger 310 on the inside of the window 308 and generate heat on the inside of the window 308 using the heater layer 110 to generate thermo-haptic feedback to communicate information to the passenger 310. The thermo-haptic feedback can be felt by the passenger 310 when the passenger 310 touches the window 308.

The information communicated to the passenger 310 can be any suitable type of information. In some arrangements, the information can be a notification (e.g., a text message, phone call, email, etc.) from one or more personal electronic devices (e.g., mobile phone) belonging to the passenger 310. Accordingly, with additional reference to FIG. 1, the transparent display system 100 can be communicatively connected to one or more personal electronic devices 124 belonging to the passenger 310 and can obtain information from the personal electronic device(s) 124 such as notifications, contact lists, etc. Additionally or alternatively, the information can be the temperature of an external environment of the vehicle 300 (or, if the window is a building window, an external environment of the building). Accordingly, the transparent display system 100 can include a temperature sensor 126 configured to detect the temperature of the external environment. Additionally or alternatively, when the transparent display system 100 is used in a ride-sharing context, as described above, the information can be information about the trip, such as the direction in which the vehicle 300 is traveling. Additionally or alternatively, the information can be an answer to a question asked by the passenger 310. For example, if the ride-sharing vehicle is driven by a human driver, the passenger 310 can ask the driver questions and the driver can answer questions through use of the transparent display system 100. Accordingly, the transparent display system 100 can include one or more input devices 128. The input device(s) 128 can include any device, component, system, element, or arrangement or groups thereof that enable information and/or data to be entered into a machine. In some arrangements, the input device(s) 128 can be one or more mobile phones. The input device(s) 128 can be configured to receive information and/or data from the passenger 310 and/or the driver. In some arrangements, the input device(s) 128 can include a passenger input device 130 and a driver input device 132. The passenger 310 may use the passenger input device 130 to ask the driver a question, and the driver can use the driver input device 132 to answer the question. The driver's input to the driver input device 132 may be used to generate the thermo-haptic feedback to communicate the information to the passenger 310 through the transparent display system 100.

Figure 3B:
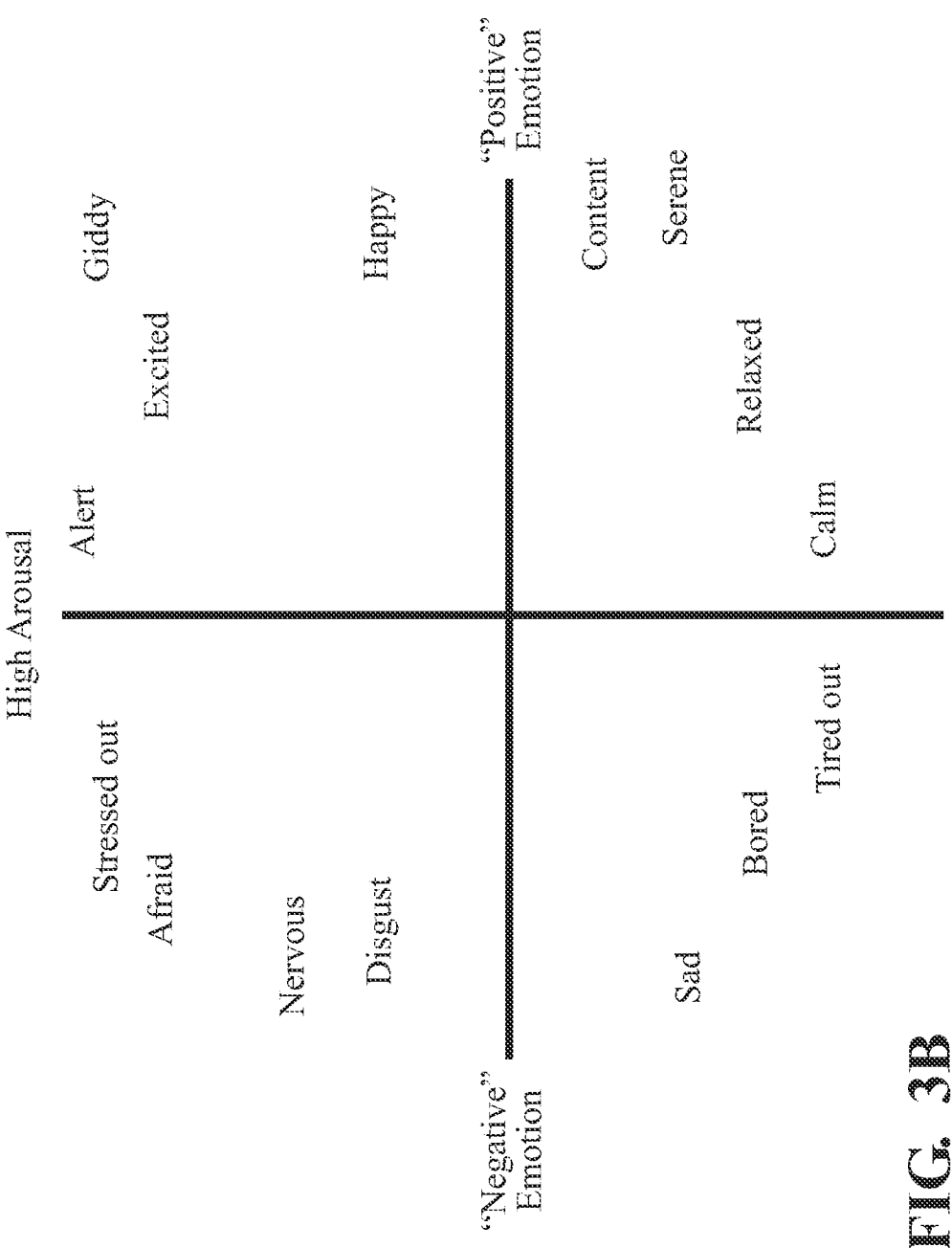
FIG. 3B is an example of information that may be communicated between users of the transparent display system, where the information is user cumulative affective states.

As mentioned above, in other examples, the transparent display system 100 may form at least a portion of a partition and/or wall in a vehicle or building and may be used to facilitate communication between two or more users. Each user may have a personal electronic device 124 (for example, a mobile phone, a tablet, a computer, and/or a wearable device such as a smart ring or a smart watch) that is communicatively connected to the transparent display system 100. Each personal electronic device 124 may be able to detect bio-signals, for example, electrodermal activity (EDA), heart rate, blood oxygen levels, etc., and transmit one or more cumulative affective states of each user to the computing device 122. Referring to FIG. 3B, examples of various cumulative affective states are shown. The computing device 122 may be configured to receive the cumulative affective state(s) and generate thermo-haptic feedback to communicate one or more of the cumulative affective state(s) between users of the transparent display system 100.

Figure 4A:
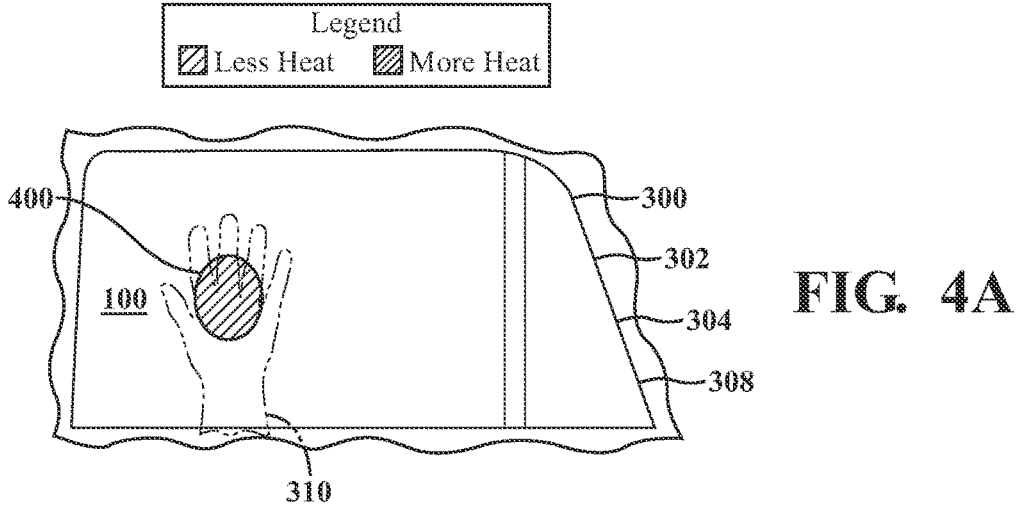
FIGS. 4A-4F are examples of various manners of communicating information encoded in a temperature-based format to a user of a transparent display system.
Figure 4B:
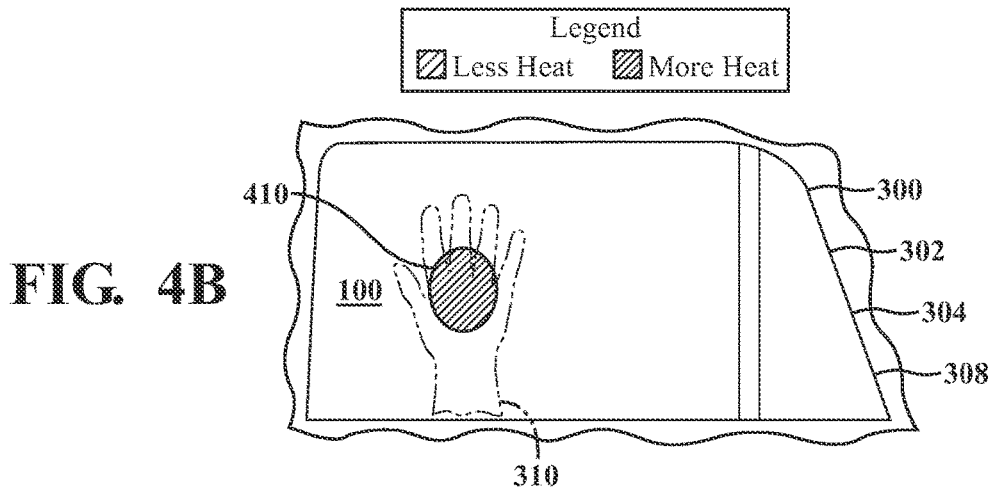

The information described in the examples above may be encoded in a temperature-based format and communicated in any suitable manner. In some arrangements, the information can be communicated as a magnitude, for example, the heater layer(s) 110 can generate a relatively smaller amount of heat to communicate certain information or a relatively larger amount of heat to communicate other information. For example, referring to FIG. 4A, the heater layer(s) 110 can be configured to generate a smaller amount of heat 400. The smaller amount of heat 400 can communicate a non-urgent notification, a cooler external environment temperature (e.g., 65-80 degrees F.), a "YES" answer, a "NO" answer, a negative emotional state, and/or a low arousal state. In another example, referring to FIG. 4B, the heater layer(s)

Figure 4C:
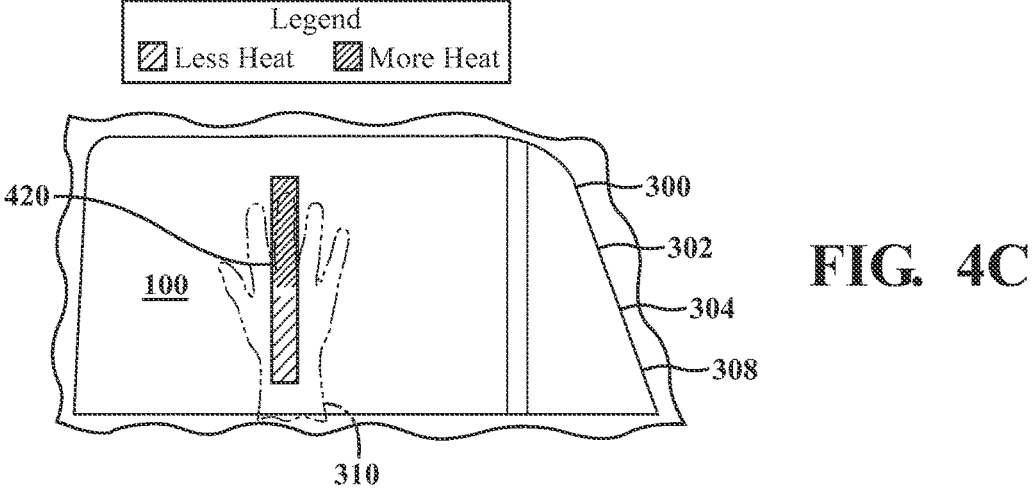
Figure 4D:
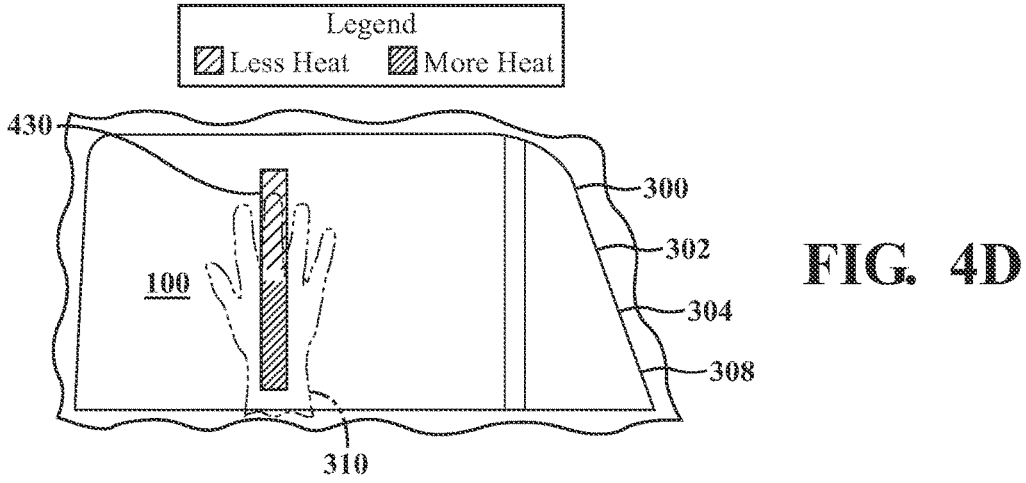
Figure 4E:
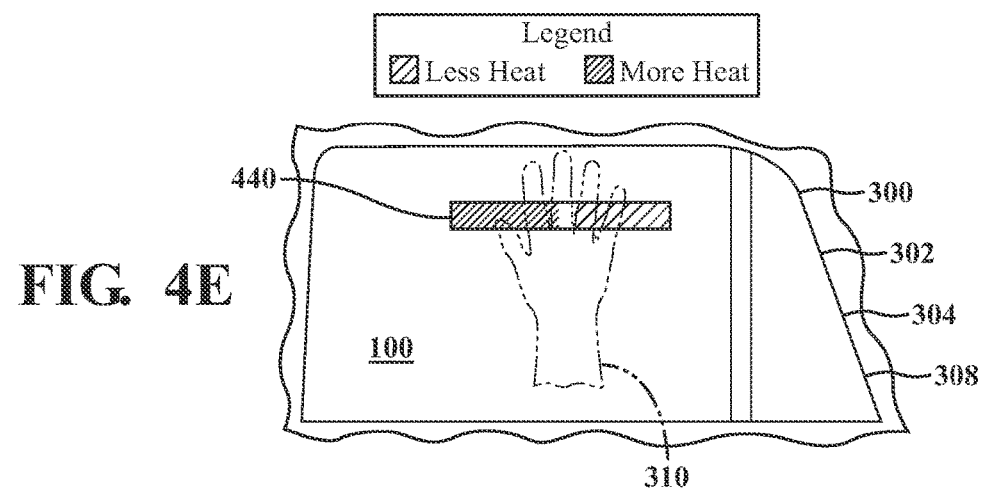
Figure 4F:
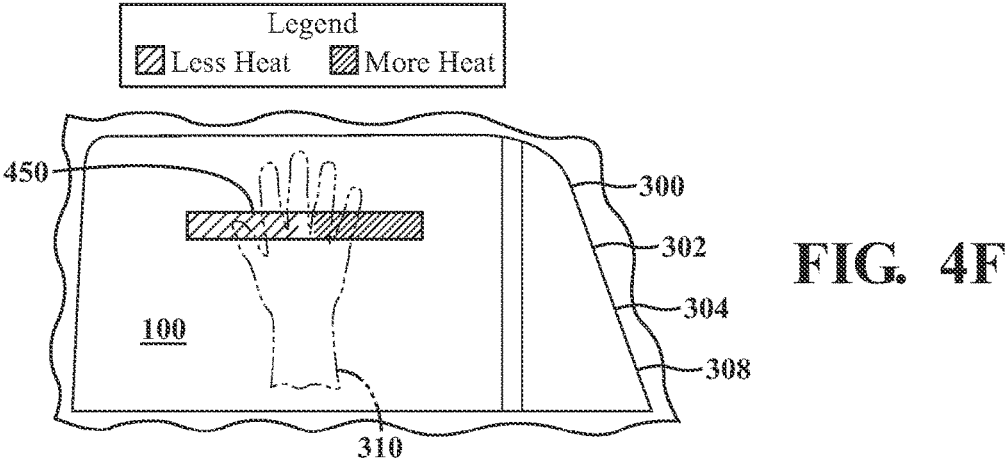

110 can be configured to generate a larger amount of heat 410. The larger amount of heat 410 can communicate an urgent notification, a warmer external environment temperature (e.g., 80-95 degrees F.), a "YES" answer, a "NO" answer, a positive emotional state, and/or a high arousal state. Additionally or alternatively, the information can be communicated as a direction, for example, the heater layer(s) 110 can generate a gradient of heat to communicate information to the passenger 310. For example, referring to FIGS. 4C-4F, the thermo-haptic feedback can be communicated as an up-down gradient 420 (FIG. 4C), a down-up gradient 430 (FIG. 4D), a left-right gradient 440 (FIG. 4E), or a right-left gradient 450 (FIG. 4F). Gradients may be used to communicate navigational information, for example, to communicate to the passenger 310 which direction the vehicle 300 is traveling in or a direction towards a location (e.g., the up-down gradient 420 can indicate a north-bound direction, the down-up gradient 430 can indicate south-bound direction, the left-right gradient 440 can indicate a west-east gradient to communicate an east-bound direction, and the right-left gradient 450 can indicate an east-west gradient to communicate a west-bound direction). Gradients may also be used to communicate changes in cumulative affective states between users of the transparent display system 100. For example, the up-down gradient 420 can indicate a change in cumulative affective state from low arousal to high arousal, the down-up gradient 430 can indicate a change in cumulative affective state from high arousal to low arousal, the left-right gradient 440 can indicate a change in cumulative affective state from a negative emotional state to a positive emotional state, and the right-left gradient 450 can indicate a change in cumulative affective state from a positive emotional state to a negative emotional state.

Figure 5:
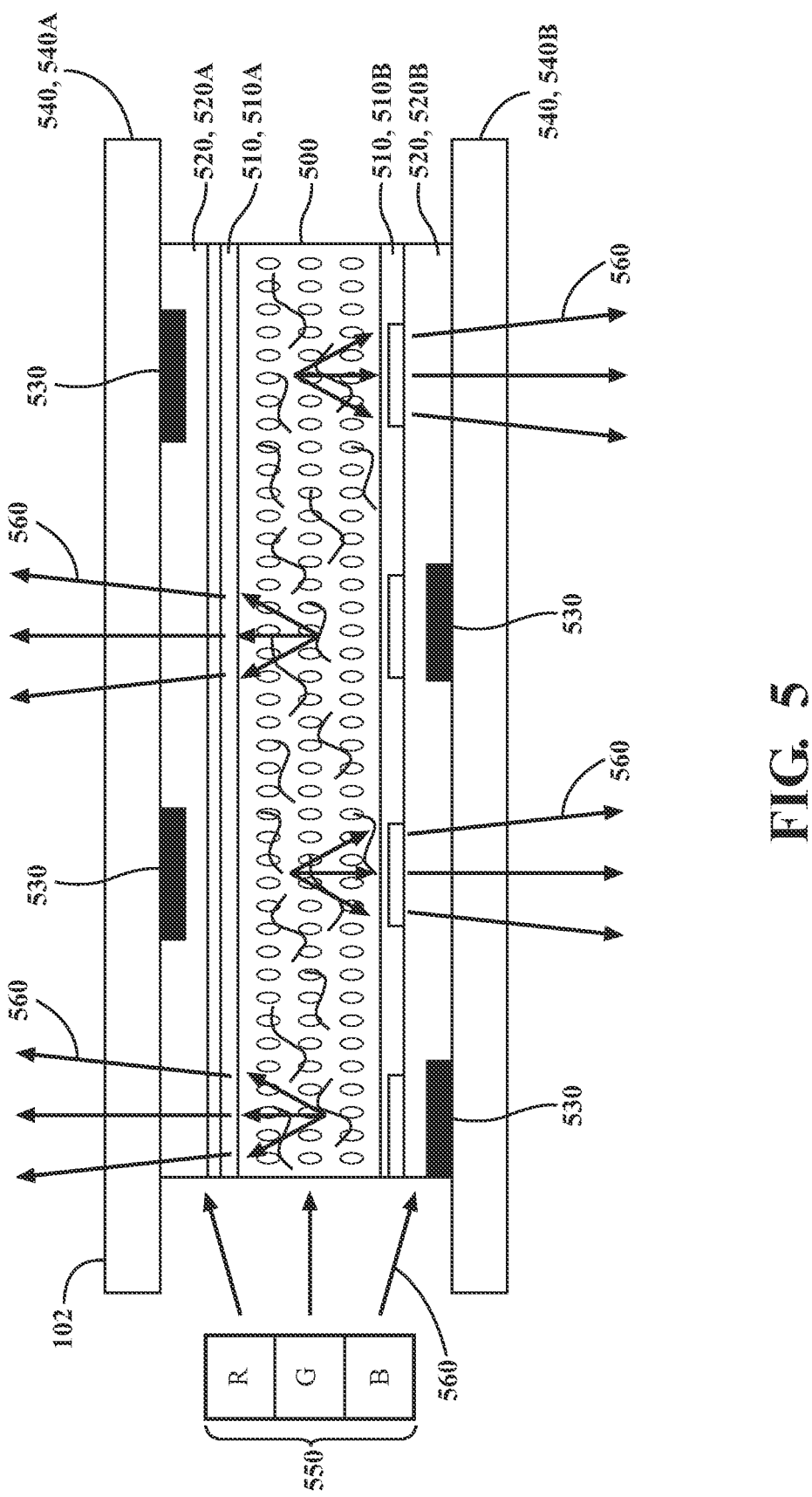
FIG. 5 is an example of a transparent display of the transparent display system.

Referring now to FIG. 5, an example of the transparent display 102 will now be described. The transparent display 102 includes one or more components configured to display content on the first side 104 and/or the second side 106 of the transparent display system 100 to a user of the transparent display system 100. Among other components, the transparent display 102 includes a liquid crystal layer 500, one or more electrode layers 510, one or more polyimide layers 520, one or more masks 530, and one or more outer layers 540, one or more of which can be formed using one or more substantially transparent materials so that the transparent display 102 is substantially transparent. The transparent display 102 also includes one or more light sources 550 configured to project light 560 along the liquid crystal layer 500 such that it is reflected out of the transparent display 102 (e.g. out of the first side 104 and/or the second side 106) for viewing by a user of the transparent display 102. The light source(s) 550 are RGB light sources and can include lasers, light-emitting diodes (LEDs), or any other suitable type of light source configured to project visible light 560.

The liquid crystal layer 500 is located between the first side 104 and the second side 106 and can be formed from any suitable type of liquid crystal, for example, polymer-dispersed liquid crystal. The liquid crystal layer 500 can be configured for anisotropic alignment within the liquid crystal matter for inducing light scattering. The liquid crystal layer 500 can have a molecular configuration that may be oriented in an ON state or an OFF state. In the ON state, the liquid crystal layer 500 allows light 560 from the light source(s) 550 to be reflected out of the first side 104 and/or the second side 106 and be visible to a user looking at the transparent display 102. In the OFF state, the liquid crystal layer 500 prevents light 560 from the light source(s) 550 from being scattered out of the transparent display 102.

The electrode layer(s) 510 can include a first electrode layer 510A and a second electrode layer 510B and can be located on either side of and attached to the liquid crystal layer 500. The electrode layer(s) 510 can be configured to activate the liquid crystal layer 500. The electrode layer(s) 510 can be formed from any suitable material, for example, indium tin oxide (ITO). Thin films of ITO can be utilized for this purpose. The polyimide layer(s) 520 can include a first polyimide layer 520A and a second polyimide layer 520B. The first polyimide layer 520A and the second polyimide layer 520B can be located on either side of and attached to the electrode layer(s) 510. The polyimide layer(s) 520 are configured as one or more alignment layer(s) for the liquid crystal layer 500. For example, the polyimide layer(s) 520 are configured to orient the liquid crystal layer 500 in the ON state or the OFF state. The mask(s) 530 can be any suitable type of mask configured to prevent light 560 from exiting the transparent display 102 in an unintended direction. For example, the mask(s) 530 can be black masks. Accordingly, the mask(s) 530 may not be transparent (e.g., they may be opaque), such that they block the transmission of light 560. The outer layer(s) 540, like the outer layer(s) 114 of FIG. 1, can be transparent panels, such as glass panels. The outer layer(s) 540 may be connected to the transparent display 102 and may be configured to cover, seal, protect, and/or enclose the components of the transparent display 102. The outer layer(s) 540 can include a first outer layer 540A connected to the first polyimide layer 520A and a second outer layer 540B connected to the second polyimide layer 520B.

While one example of a transparent display is described above, other types of transparent displays may be used. Other types of transparent display technology can include any of those disclosed in U.S. Pat. App. Pub. No. 2021/01389615A1, U.S. patent application Ser. Nos. 17/343,824, 17/348,126, 17/348,254 17/536,753, 17/536,821, which are incorporated herein by reference in their entireties.

Referring back to FIG. 1, as mentioned above, the transparent display system 100 can include various components including a computing device 122, one or more processors 116, a memory 118, and a control module 120. The processor(s) 116, the memory 118, and the control module 120 together serve as the computing device 122 whose control module 120 orchestrates the operation of the transparent display system 100, including but not limited to the operation of the heater layer(s) 110. The control module 120 can be configured to detect the location of a user's touch on the transparent display system 100. Based on information received by the computing device 122 and the location of the user's touch, the control module 120 can be configured to operate one or more components of the transparent display system 100. For example, the control module 120 can operate the electrode(s) 220 to activate the trace array 200 to generate heat to heat at least a portion of the transparent display system 100. More specifically, when the control module 120 receives information and detects a user's touch on the transparent display system 100, the control module 120 can be configured to operate the electrode(s) 220 to activate the heat pixel(s) 230 associated with the area of the transparent display system 100 that the user is touching.

The control module 120 may be a global control module. Relatedly, as part of a central control system, the transparent display system 100 may include a global control unit (GCU) with which the control module 120 is communicatively connected. Alternatively, the control module 120 may be a global control module. Relatedly, as part of a central control system, the transparent display system 100 may include a global control unit (GCU) to which the control module 120 belongs. Although the transparent display system 100, as shown, includes one control module 120, it will be understood that this disclosure is applicable in principle to otherwise similar transparent display systems including multiple control modules.

The processor(s) 116 may be any components configured to execute any of the processes described herein or any form of instructions to carry out such processes or cause such processes to be performed. The processor(s) 116 may be implemented with one or more general-purpose or special-purpose processors. Examples of suitable processors include microprocessors, microcontrollers, digital signal processors, or other forms of circuitry that execute software. Other examples of suitable processors include, without limitation, central processing units (CPUs), array processors, vector processors, digital signal processors (DSPs), field-programmable gate arrays (FPGAs), programmable logic arrays (PLAs), application-specific integrated circuits (ASICs), programmable logic circuitry, or other controllers.

The processor(s) 116 may include at least one hardware circuit (e.g., an integrated circuit) configured to carry out instructions contained in program code. In arrangements where there are multiple processor(s), the processor(s) may work independently from each other or in combination with one another. The memory 118 may be a non-transitory computer-readable medium. The memory 118 may include volatile or nonvolatile memory, or both. Examples of suitable memory include random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination of these. The memory 118 includes stored instructions in program code. Such instructions are executable by the processor(s) 116 or the control module 120. The memory 118 may be part of the processor(s) 116 or the control module 120 or may be communicatively connected to the processor(s) 116 or the control module 120.

Generally speaking, the control module 120 includes instructions that may be executed by the processor(s) 116. The control module 120 may be implemented as computer-readable program code that, when executed by the processor(s) 116, execute one or more processes described herein. Such computer-readable program code may be stored in the memory 118. The control module 120 may be part of the processor(s) 116 or may be communicatively connected to the processor(s) 116.

The various components of the transparent display system 100 can be communicatively linked to one another or one or more other element(s) through one or more communication networks. The term "communicatively linked," as used herein, can include direct or indirect connections through a communication channel, bus, pathway, or another component or system. The term "communication network," as used herein, means one or more components designed to transmit and/or receive information from one source to another. The elements of the system can include and/or execute suitable communication software, which enable the various elements to communicate with each other through the communication network and perform the functions disclosed herein.

The communication network(s) can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, a USB interface, and/or one or more intranets. The communication network(s) can be implemented as or include one or more wireless networks, whether short range (e.g., a local wireless network built using a Bluetooth or one of the IEEE 802 wireless communication protocols, e.g., 802.11 a/b/g/I, 802.15, 802.16, 802.20, Wi-Fi Protected Access (WPA or WPA2) or long range (e.g., a mobile, cellular, and/or satellite-based wireless network; GSM, TDMA, CDMA, WCDMA networks, or the like). The communication network(s) can include wired communication links and/or wireless communication links. The communication network(s) can include any combination of the above networks and/or other types of networks.

Now that the various potential systems, devices, elements, and/or components of the transparent display system 100 have been described, a method 600 for operating the transparent display system 100, including various possible steps of such method, will now be described. The method 600 described may be applicable to the arrangements described above, but it is to be understood that the method 600 can be carried out with other suitable systems and arrangements. Moreover, the method 600 may include other steps not shown here, and the method 600 is not limited to including every step shown. The blocks illustrated here as part of the method 600 are not limited to the particular chronological order. Indeed, some of the blocks may be performed in a different order than what is shown and/or at least some of the blocks can occur simultaneously.

Figure 6:
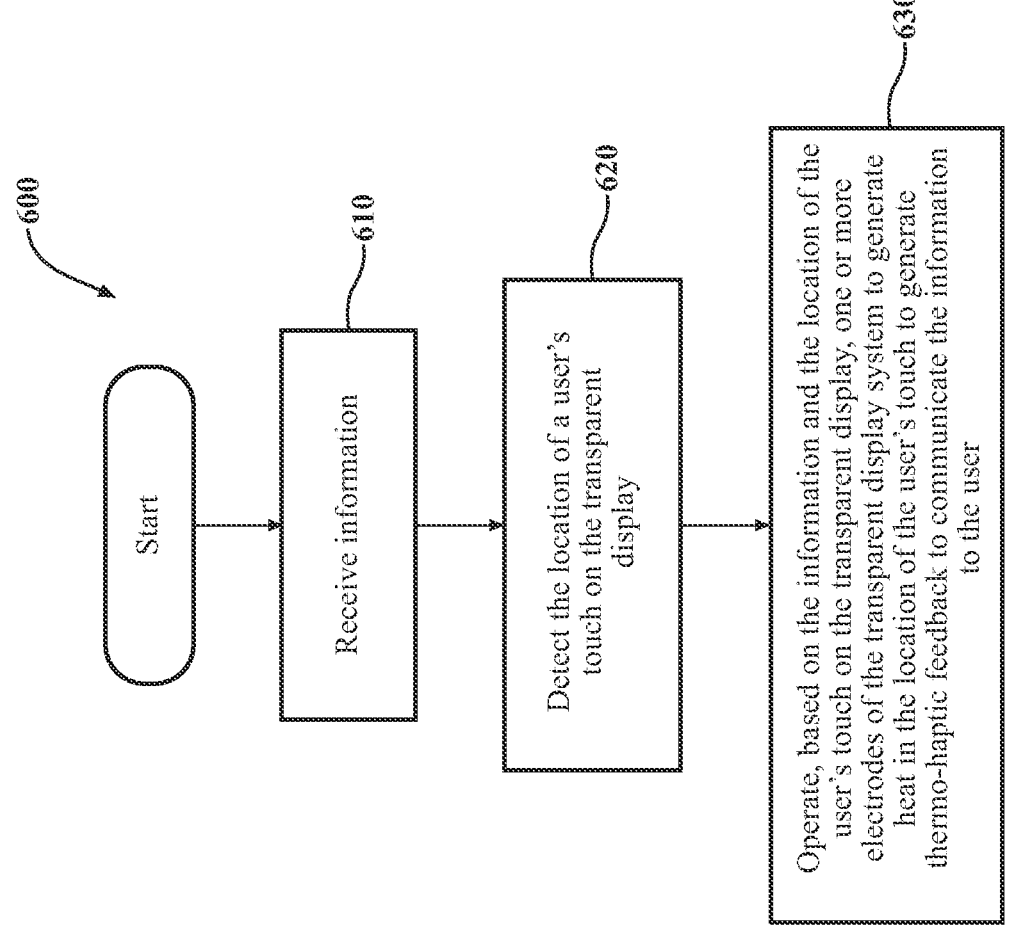
FIG. 6 is an example of a method of operating the transparent display system.

Referring to FIG. 6, an example of the method 600 is shown. The method 600 may begin at operation 610. Referring to FIG. 6, an example of a method is shown. In operation 610, the computing device can receive information. For example, the computing device can receive information from a one or more input devices (e.g., a passenger's input device and/or a driver's input device), one or more personal electronic devices (e.g., a smart ring, a smart watch, etc.), a temperature sensor, etc. In operation 620, the computing device can detect a user's hand on the transparent display system. For example, the computing device can detect, using the touch-sensitive layer(s), a user's finger or hand placed on the transparent display system. In operation 630, based on the information and the location of the user's hand, the computing device can operate the electrode(s) to heat activate the trace array to generate heat at least a portion of the transparent display system in the location of the user's touch to communicate generate thermo-haptic feedback to communicate information to the user.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A transparent display system, comprising:
   a transparent display including transparent outer layers;
   a touch-sensitive layer disposed between the transparent outer layers, connected to the transparent display, and configured to detect a user's touch on the transparent display; and
   a heater layer disposed between the transparent outer layers, connected to the transparent display, combining with the transparent display and the touch-sensitive layer to form the transparent display system as transparent, and comprising a trace array and one or more electrodes that are configured to activate the trace array to generate heat in a location of the user's touch to generate thermo-haptic feedback to communicate information to the user.

2. The transparent display system of claim 1, wherein the transparent display forms at least a portion of a vehicle window, and wherein the touch-sensitive layer and the heater layer are connected to an inside of the vehicle window.

3. The transparent display system of claim 1, wherein the trace array forms a grid of heat pixels, and wherein each heat pixel is configured for individual activation such that the one or more electrodes are configured to activate one or more heat pixels to generate heat in the location of the user's touch.

4. The transparent display system of claim 1, wherein the transparent display system as transparent, permitting permits conveyance of light between the transparent outer layers without substantial attenuation.

5. The transparent display system of claim 1, wherein the information is a notification, and wherein the one or more electrodes are configured to activate the trace array to generate heat in the location of the user's touch to generate thermo-haptic feedback to communicate the notification to the user.

6. The transparent display system of claim 1, wherein the information is a temperature of an external environment, and wherein the one or more electrodes are configured to activate the trace array to generate heat in the location of the user's touch to generate thermo-haptic feedback to communicate the temperature of the external environment to the user.

7. The transparent display system of claim 1, wherein the information is an answer to a question asked by a passenger of a vehicle, and wherein the one or more electrodes are configured to activate the trace array to generate heat in a location of a touch of the passenger to generate thermo-haptic feedback to communicate the answer to the question asked by the passenger.

8. The transparent display system of claim 1, wherein the information is a direction, and wherein the one or more electrodes are configured to activate the trace array to generate heat in the location of the user's touch to generate thermo-haptic feedback to communicate the direction to the user.

9. The transparent display system of claim 8, wherein the direction is at least one of a north-bound direction communicated by an up-down heat gradient, a south-bound direction communicated by a down-up heat gradient, an east-bound direction communicated by a right-left heat gradient, and a west-bound direction communicated by a left-right heat gradient.

10. The transparent display system of claim 1, wherein the information is a first user cumulative affective state, and wherein the one or more electrodes are configured to activate the trace array to generate heat in a location of a touch of a second user to generate thermo-haptic feedback to communicate the cumulative affective state of the first user to the second user.

11. A vehicular body structure, comprising:
a window frame;
a window configured for installation in the window frame; and a transparent display system forming at least a portion of the window and comprising:
a transparent display including transparent outer layers;
a touch-sensitive layer disposed between the transparent outer layers, connected to the transparent display, and configured to detect a user's touch on the transparent display; and
a heater layer disposed between the transparent outer layers, connected to the transparent display, combining with the transparent display and the touch-sensitive layer to form the transparent display system as transparent, and comprising a trace array and one or more electrodes that are configured to activate the trace array to generate heat in a location of the user's touch to generate thermo-haptic feedback to communicate information to the user.

12. The vehicular body structure of claim 11, wherein the trace array forms a grid of heat pixels, and wherein each heat pixel is configured for individual activation such that the one or more electrodes are configured to activate one or more heat pixels to generate heat in the location of the user's touch.

13. The vehicular body structure of claim 11, wherein the transparent display system permits conveyance of light between the transparent outer layers without substantial attenuation.

14. The vehicular body structure of claim 11, wherein the information is a notification, and wherein the one or more electrodes are configured to activate the trace array to generate heat in the location of the user's touch to generate thermo-haptic feedback to communicate the notification to the user.

15. The vehicular body structure of claim 11, wherein the information is a temperature of an external environment, and wherein the one or more electrodes are configured to activate the trace array to generate heat in the location of the user's touch to generate thermo-haptic feedback to communicate the temperature of the external environment to the user.

16. The vehicular body structure of claim 11, wherein the information is an answer to a question asked by a passenger of a vehicle, and wherein the one or more electrodes are configured to activate the trace array to generate heat in a location of a touch of the passenger to generate thermo-haptic feedback to communicate the answer to the question asked by the passenger.

17. The vehicular body structure of claim 11, wherein the information is a direction, and wherein the one or more electrodes are configured to activate the trace array to generate heat in the location of the user's touch to generate thermo-haptic feedback to communicate the direction to the user.

18. The vehicular body structure of claim 11, wherein the information is a first user cumulative affective state, and wherein the one or more electrodes are configured to activate the trace array to generate heat in a location of a touch of a second user to generate thermo-haptic feedback to communicate the cumulative affective state of the first user to the second user.

19. A method of communicating information to a user of a transparent display system, the transparent display system comprising a transparent display including transparent outer layers, a touch-sensitive layer disposed between the transparent outer layers and connected to the transparent display, and a heater layer disposed between the transparent outer layers, connected to the transparent display, combining with the transparent display and the touch-sensitive layer to form the transparent display system as transparent, and comprising a trace array and one or more electrodes, the method comprising:

receiving, using a computing device, information to communicate to the user;

detecting, using the touch-sensitive layer, a location of a user's touch on the transparent display; and operating, using the computing device, based on the information and the location of the user's touch on the transparent display, the one or more electrodes to activate the trace array to generate heat in a location of the user's touch to generate thermo-haptic feedback to communicate the information to the user.

20. The method of claim 19, wherein receiving information to communicate to the user includes receiving at least one of a notification, a temperature of an external environment, an answer to a question, a direction, and a user cumulative affective state, and wherein operating the one or more electrodes includes operating the one or more electrodes activate the trace array to generate heat in a location corresponding to the user's touch to generate thermo-haptic feedback to communicate the at least one of the notification, the temperature of the external environment, the answer to the question, the direction, and the user cumulative affective state to a user of the transparent display system.

<center>* * * * *</center>